No. 658,552. Patented Sept. 25, 1900.
A. E. MATHEY.
CLUTCH AND BRAKE.
(Application filed Nov. 13, 1899.)
(No Model.) 2 Sheets—Sheet 2.
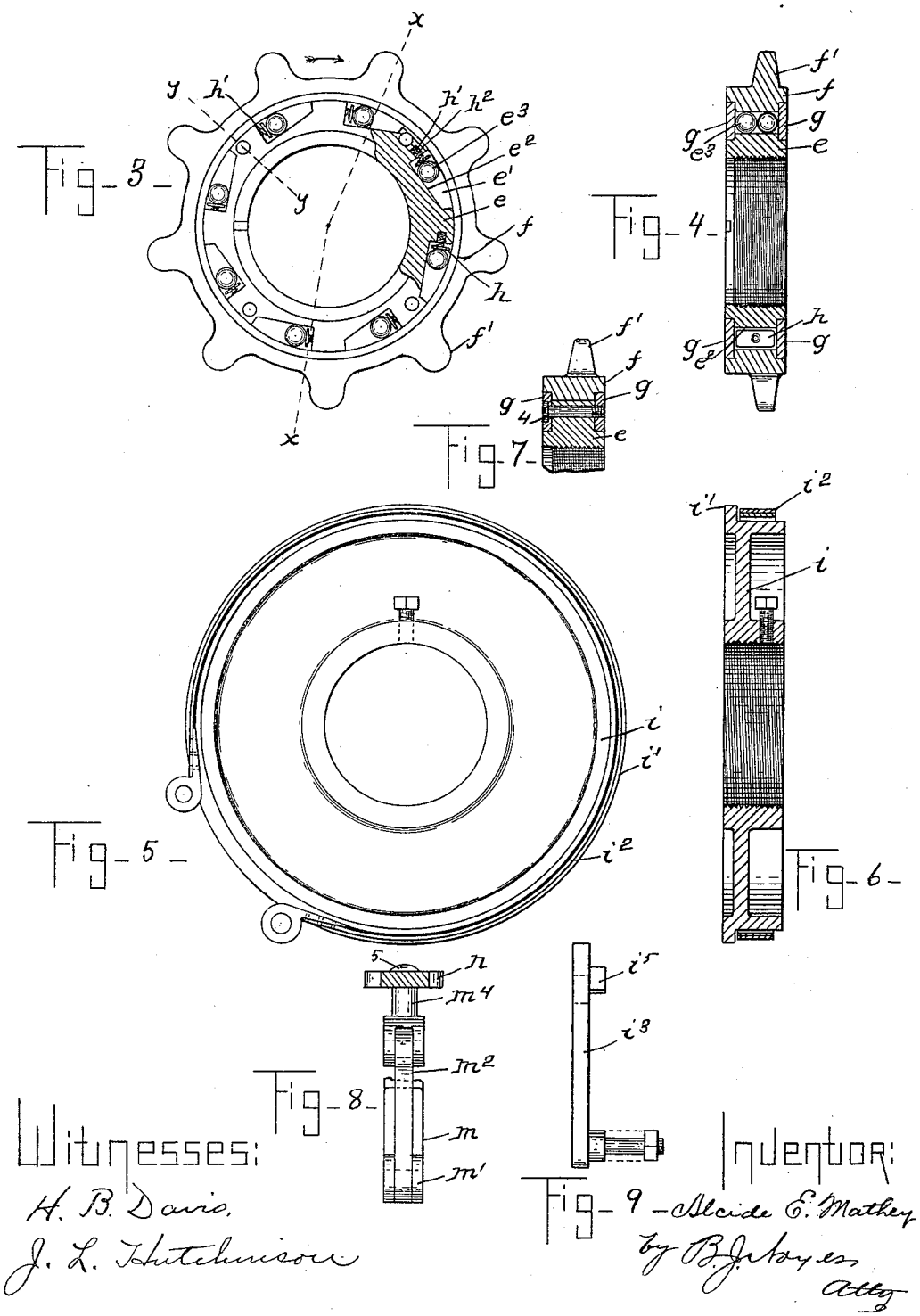
Witnesses:
H. B. Davis.
J. L. Hutchinson.
Inventor:
Alcide E. Mathey
by B. J. Noyes,
Atty

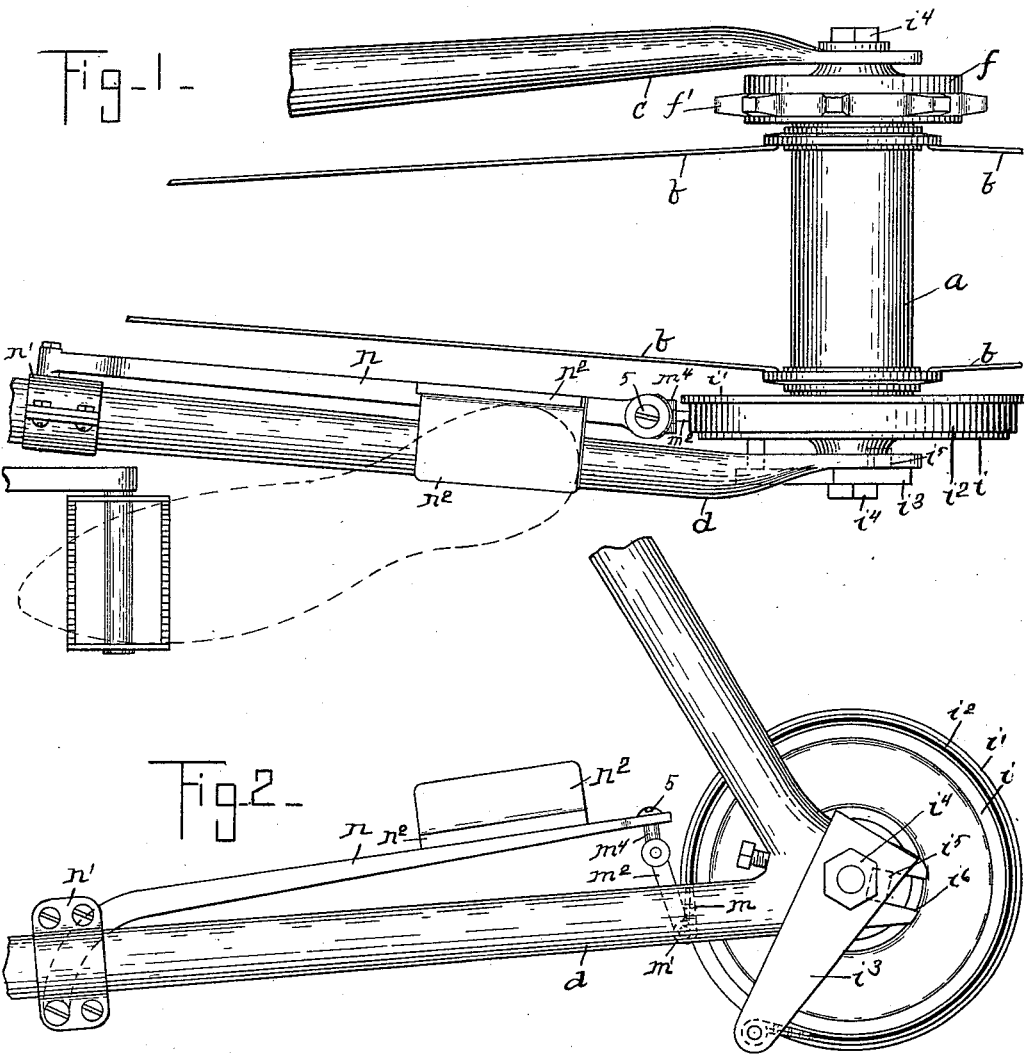

UNITED STATES PATENT OFFICE.

ALCIDE E. MATHEY, OF WALTHAM, MASSACHUSETTS.

CLUTCH AND BRAKE.

SPECIFICATION forming part of Letters Patent No. 658,552, dated September 25, 1900.

Application filed November 13, 1899. Serial No. 736,782. (No model.)

*To all whom it may concern:*

Be it known that I, ALCIDE E. MATHEY, of No. 29 Prospect street, Waltham, county of Middlesex, and State of Massachusetts, have invented an Improvement in Clutch and Brake Appliances, of which the following description, in connection with the accompanying drawings, is a specification, like characters on the drawings representing like parts.

This invention has for its object to improve the construction of clutch and brake appliances for bicycles; and it consists in a novel form of clutch between the driving-shaft and crank-shaft, also in a novel form of brake for the rear driving-wheel comprising a disk on the hub of said wheel, a band surrounding or inclosing it, and a foot-lever for operating said brake-band which is so applied to the machine and so disposed relatively to one of the pedals that it may be operated by the heel of the rider with his foot resting on the pedal and the pedal held at rest, a result which can be accomplished only when a clutch is provided between the driving-shaft and crank-shaft.

Figure 1 shows in plan view a portion of a bicycle provided with a clutch and brake appliance embodying this invention. Fig. 2 is a side view of a portion of the machine, showing particularly the brake. Fig. 3 is a side view of the clutch connecting the sprocket-wheel with the hub of the rear driving-wheel, one of the side plates being removed to expose the parts of the clutch. Fig. 4 is a section of the clutch shown in Fig. 3, taken on the dotted line $x\,x$. Fig. 5 is a detail of a portion of the clutch-ring and sprocket-wheel, taken on the dotted line $y\,y$, Fig. 3. Fig. 6 is a side view of the disk and band of the brake mechanism; Fig. 7, a vertical section of the disk and band shown in Fig. 5, and Figs. 8 and 9 are details of parts of the brake mechanism.

$a$ represents the hub of the rear driving-wheel of the bicycle, $b$ the spokes of the same, and $c$ and $d$ parts of the usual frame. A clutch-ring $e$ is screwed onto or otherwise secured to one end of said hub $a$, and said clutch-ring is herein represented as having a number of ball-receiving recesses $e'$, eight such recesses being herein shown. Although any other number may be provided, yet a greater number than four is preferred. Each ball-receiving recess is formed with an inclined bottom $e^2$, on which the balls $e^3$ rest. $f$ represents an outer ring which is placed upon and adapted to inclose the clutch-ring $e$, and said outer ring is formed with sprocket-teeth $f'$, which may be of any usual or suitable shape to receive a sprocket-chain of usual construction.

Two flat rings or ring-like plates $g\,g$ are provided, which are placed in concentric grooves or recesses formed in the clutch-ring $e$ and in the outer ring $f$, being located one at each side of said rings, and said ring-like plates $g\,g$ are secured to the clutch-ring $e$ by screws 4 or by any other suitable means.

The ring-like plates $g\,g$ when secured in place on the clutch-ring $e$ cover the ends or sides of the ball-receiving recesses $e'$, and also serve as a means of holding the outer ring $f$ in place on the clutch-ring.

In each ball-receiving recess $e'$ two balls are provided, which are located side by side and adapted to work together, and the balls contained in each recess are pressed forward or in a direction toward the upper end of the inclined bottom of the recess by a spring.

The means herein employed for exerting a pressure upon the balls consists of a flat plate $h$, contained in the ball-receiving recess, which is adapted to contact with the balls, said plate $h$ having upon its back side a short spiral spring $h'$, which enters a socket $h^2$, formed or provided in the clutch-ring, which is in communication with the ball-receiving recess. The spiral spring $h'$ is attached at one end to the plate $h$ and, bearing upon the bottom of the socket, has a tendency to throw said plate $h$ toward or against the balls.

The spiral spring $h'$ is attached to the plate $h$ at a point substantially midway its length and width, and the socket $h^2$ is made large enough to not only receive said spring but to also permit said spring to gyrate or rock more or less in the socket, if desired, and the plate $h$ is made rectangular in shape or more or less elongated to bear upon both of the balls, and if one of the balls should be a trifle larger than the other said plate will rock to compensate for such irregularity.

The clutch operates in the usual manner—*i. e.*, when the outer ring or sprocket-wheel is turned in one direction, as, for instance, as indicated by the arrow in Fig. 3, the balls will be moved and the clutch-ring will be turned with the outer ring, and when said outer ring or sprocket-wheel is held at rest said clutch-ring is free to revolve within it in the same direction. Rollers may be employed in lieu of the balls.

$i$ represents a circular disk which is screwed onto or otherwise secured to the opposite end of the hub $a$, and said disk is represented as having a peripheral flange $i'$ on one side of its outer face. A band $i^2$ passes around said disk or flange $i$, one end of which is attached at a fixed point and the other end to a movable member, and whenever said band is turned so as to tightly engage the disk $i$ the friction is sufficient to resist further revolution of the driving-wheel.

An arm $i^3$ is secured to the frame of the machine, to the outer extremity of which one end of the band $i^2$ is attached, and said arm serves as the fixed point of attachment for said band, and said arm $i^3$ is herein shown as a flat plate having a hole through it which receives the axle of the driving-wheel, and said plate is placed on said axle just outside of the frame and is secured in place by the usual nut $i^4$ on the axle. To prevent said arm from rotating, it has formed on its rear side or face a lug $i^5$, (see dotted lines, Fig. 2,) which enters a slot or opening $i^6$ in the frame of the machine, such slot or opening being usual in bicycle-frames. The other end of the friction-band $i^2$ has secured to it a plate $m$, formed with a pair of ears $m'$, to which is loosely connected one end of a short bar or link $m^2$, the opposite end of said bar or link being loosely connected to a pair of ears $m^3$, formed on a lug $m^4$, projecting from the under side of a lever $n$. The lug $m^4$ may be rigidly secured to said lever $n$ by a screw 5 or it may be secured thereto in any other suitable manner. The lever $n$ is pivotally connected to a clamp $n'$, mounted on one of the bars of the frame of the machine, and extends rearward toward the rear driving-wheel, and it has mounted upon or secured to it a plate $n^2$, adapted to be engaged by the heel of the rider.

The lever $n$ extends along the frame of the machine and is so disposed relatively to one of the pedals that while the foot of the rider is yet resting on said pedal and said pedal held at rest his heel may be swung to one side into proper position to engage the heel-plate $n^2$ and at such time depress the lever $n$ to apply the brake.

Of course it will be understood that such a brake cannot be used except in connection with a clutch between the driving-shaft and crank-shaft, for a moving pedal will not permit the foot of the rider to remain at rest and allow him to engage and operate the foot-lever $n$.

I claim—

1. In a bicycle, a clutch composed of a clutch-ring $e$ having ball-receiving recesses $e'$ formed with inclined bottoms, a pair of balls contained in each ball-receiving recess, a plate contained in each recess bearing upon said balls, each plate having a spiral spring attached to it which enters a socket in the clutch-ring, an outer ring $f$ having thereon sprocket-teeth $f'$, and the ring-like plates $g, g$, substantially as described.

2. In a bicycle having a clutch between the crank-shaft and driving-shaft, a brake for the driving-wheel comprising a disk and band on said disk connected at one end to a fixed point and a foot-lever connected to the opposite end of said band, said foot-lever so disposed relatively to one of the pedals as to be engaged by the heel of the rider while his foot is still resting on said pedal and thereby holding said pedal at rest, substantially as described.

3. In a bicycle having a clutch between the crank-shaft and driving-shaft, a brake for the driving-shaft comprising a disk and band on said disk connected at one end to an arm mounted on the axle having a lug which enters a slot or opening in the frame, and a foot-lever connected to the opposite end of said band, said foot-lever so disposed relatively to one of the pedals as to be engaged by the heel of the rider while his foot is still resting on the pedal and the pedal thereby held at rest, substantially as described.

In testimony whereof I have signed my name to this specification in the presence of two subscribing witnesses.

ALCIDE E. MATHEY.

Witnesses:
  B. J. NOYES,
  J. L. HUTCHINSON.